United States Patent
Liu et al.

(10) Patent No.: US 8,916,299 B1
(45) Date of Patent: Dec. 23, 2014

(54) MICROBIAL FUEL CELL INTEGRATED IN VEHICLE

(75) Inventors: Wayne P. Liu, San Diego, CA (US); Adriane Q. Wotawa-Bergen, San Diego, CA (US); David B. Chadwick, San Diego, CA (US); Ken E. Richter, San Diego, CA (US); Yolanda M. Arias-Thode, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 801 days.

(21) Appl. No.: 13/172,770

(22) Filed: Jun. 29, 2011

(51) Int. Cl.
*H01M 8/16* (2006.01)
*B63G 8/00* (2006.01)

(52) U.S. Cl.
USPC ............ 429/401; 429/119; 114/317; 114/331

(58) Field of Classification Search
CPC ......... H01M 4/881; H01M 8/16; H01M 8/22; B63G 8/001; B63G 2008/002; B63G 2008/004
USPC .......... 429/119, 401; 114/256, 312, 317, 326, 114/331–333
See application file for complete search history.

(56) References Cited

U.S. PATENT DOCUMENTS

| | | | |
|---|---|---|---|
| 6,913,854 | B1 | 7/2005 | Alberte et al. |
| 2007/0022935 | A1* | 2/2007 | Griffith et al. ................ 114/312 |
| 2007/0059565 | A1* | 3/2007 | Siu et al. ........................... 429/2 |
| 2008/0053359 | A1* | 3/2008 | Shu .............................. 114/338 |

OTHER PUBLICATIONS

Nielsen, M.E. et al. "Enhanced Power from Chambered Benthic Microbial Fuel Cells" Enviro. Sci. Technol. 2007, 22, 7895-7900, Oct. 17, 2007.

* cited by examiner

*Primary Examiner* — Basia Ridley
*Assistant Examiner* — James Erwin
(74) *Attorney, Agent, or Firm* — SPAWAR Systems Center Pacific; Pete Lipovsky; Kyle Eppele

(57) ABSTRACT

A self-propelled microbial fuel cell apparatus includes a microbial fuel cell with a cathode electrode and an anode electrode wherein the anode electrode is enclosed within an enclosure that has an opening in it. The microbial fuel cell is positioned within a self-propelled delivery vehicle so that the electrodes of the fuel cell are exposed to interface with a microbial environment.

3 Claims, 5 Drawing Sheets

MICROBIAL FUEL CELL INTEGRATED IN VEHICLE

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Please reference Navy Case No. 101037.

INCORPORATION BY REFERENCE

The following document is hereby incorporated by reference herein in its entirety: U.S. Pat. No. 6,913,854.

BACKGROUND

By integrating vehicles with microbial fuel cells that generate energy thru ground, liquid, or atmospheric interfaces, a vehicle can achieve remote, in-situ, charging to extend or perform missions and thereby have less reliance on home bases or support stations for energy replenishment. In essence, a mobile asset with such capabilities can "sleep" or recharge in remote operational areas such that it can harvest sufficient energy from the environment to work persistently without the need for intervention to re-power.

SUMMARY

A self-propelled microbial fuel cell apparatus includes a microbial fuel cell with a cathode electrode and an anode electrode wherein the anode electrode is enclosed within an enclosure that has an opening in it. The part-enclosed microbial fuel cell is positioned within a self-propelled delivery vehicle so that the electrodes of the fuel cell are exposed to interface with a microbial environment.

DETAILED DESCRIPTION

Figure 1:
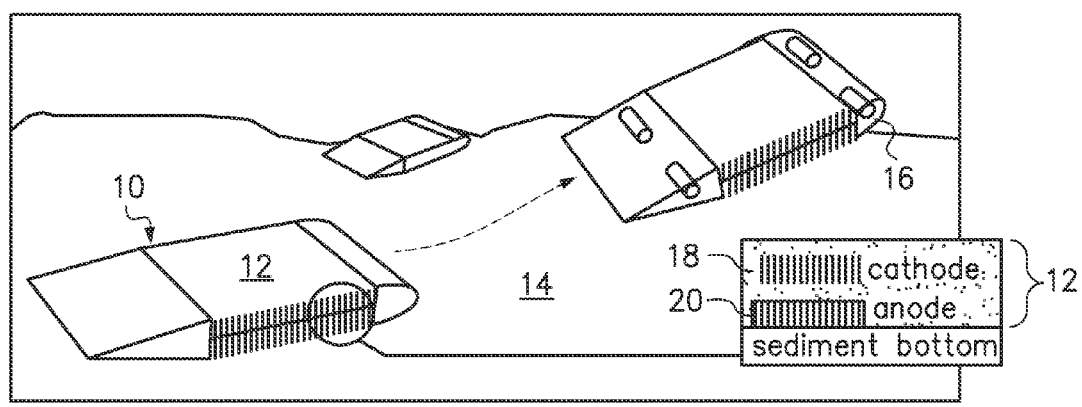
FIG. 1 illustrates a representative embodiment of one self-propelled microbial fuel cell as further described herein.

Referring to FIG. 1, there is shown one representative embodiment of the invention, whereby a self-propelled delivery vehicle 10 such as an unmanned bottom-dwelling ocean glider, for example, utilizes a microbial fuel cell 12 that generates fuel cell energy from a marine sediment environment such as on ocean floor 14. Vehicle 10 uses a propelling mechanism such as buoyancy engines 16 to move thru water.

As can be seen in the enlarged in-set, microbial fuel cell 12 has an upper cathode electrode 18 that is subject to seawater exposure and a lower anode electrode 20 that is bottom-side exposed to ocean floor sediment. In this illustration, vehicle 10 and fuel cell 12 are shown to be initially resting in a bottom-contact position.

The seawater and marine sediment make up a microbial environment suitable for microbial fuel cell operation, however it is to be noted that other environments may be equally suitable such as those present at other liquid, ground or atmospheric interfaces.

Vehicle 10, with microbial fuel cell 12 as mid-body, incorporates within it sensors, buoyancy devices, navigation and communication devices as needed and as are well understood in the art.

Figure 2:
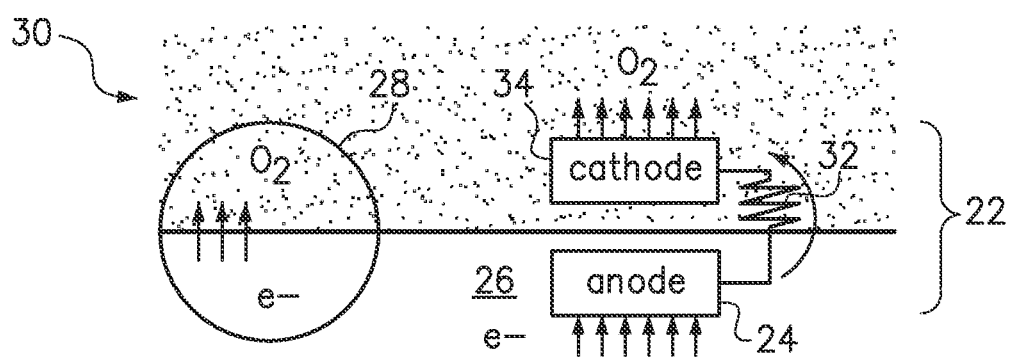
FIG. 2 illustrates a prior art microbial fuel cell embodiment wherein an anode electrode is buried in marine sediment.

Referring now to FIG. 2, there is shown a prior art microbial fuel cell 22 such as described in U.S. Pat. No. 6,913,845 incorporated by reference herein. Fuel cell 22 uses an anode structure 24 buried in sea-bed sediment 26 to capture free electrons generated when anaerobic or facultative anaerobic bacteria metabolize sediment based nutrients. Anode 24 resides in an anaerobic (oxygen-free) medium.

The free electrons (e−) of the metabolized sediment require a terminal electron acceptor shown generally at 28, such as dissolved oxygen (O2) present in water 30, to facilitate the microbial fuel cell process. Anode 24 is inserted in place of naturally occurring electron acceptors and is used to harvest the flow of electrons. The captured electrons are then passed through an electrical load such as a load 32 en route to cathode 34 for release to sources of dissolved oxygen in water 30.

Figure 3:
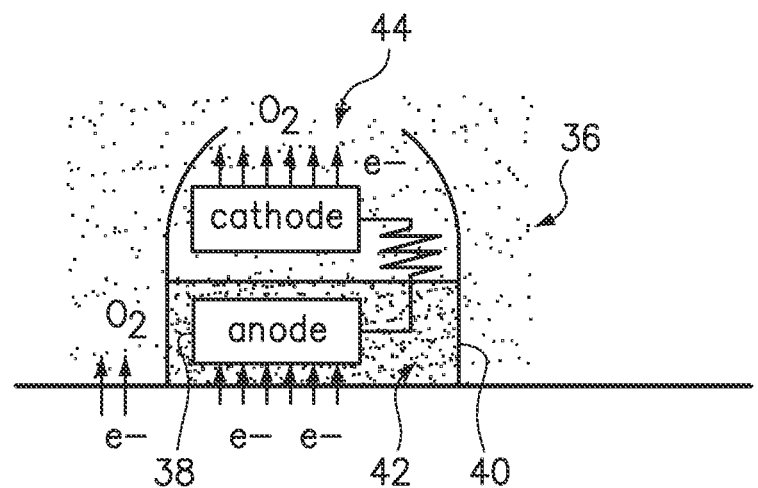
FIG. 3 is a second prior art microbial fuel cell embodiment wherein an anode electrode is suspended above marine sediment in an anaerobic chamber.

FIG. 3 illustrates a modified microbial fuel cell as described in the article "Enhanced Power from Chambered Benthic Microbial Fuel Cells", by Mark E. Nielsen, Clare E. Reimers and Hilmar A. Stecher III, found in *Environmental Science & Technology*, vol. 41, no. 22, 2007, pp. 7895-7900, incorporated by reference herein. In this modified microbial fuel cell design 36 there is employed an-above ground anode 38 that is placed within an open bottomed enclosure 40. Enclosure 40 provides a barrier against dissolved oxygen so that chambered seawater 42 becomes anaerobic. Cathode 44 is free flooded. This fuel cell design eliminates the need for fully buried anode structures.

Figure 4:
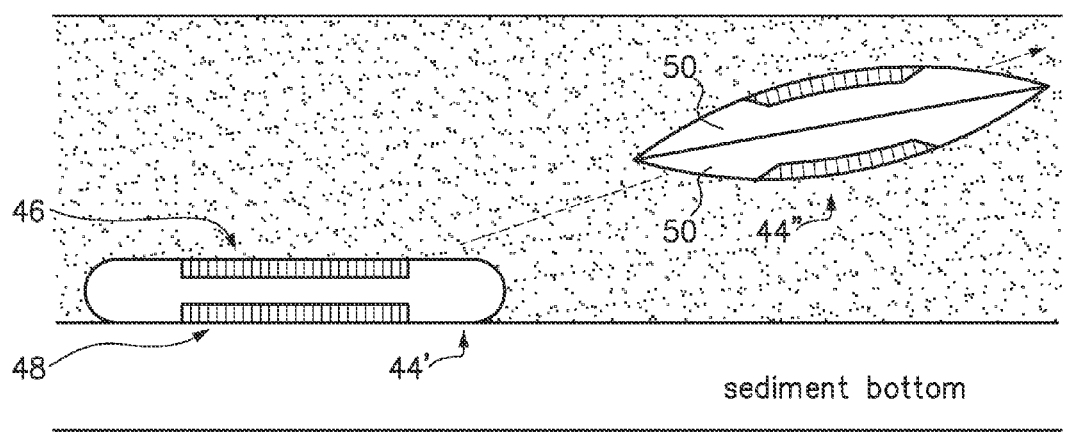
FIG. 4 shows an embodiment of the self-propelled microbial fuel cell as further described herein, the embodiment transmuting between a streamlined locomotion mode and a substantially planar bottom-contact mode.

In FIG. 4, there is shown a self-propelled microbial fuel cell 44 as to be further described herein. Self-propelled microbial fuel cell apparatus 44 is shown in a bottom-contact mode at 44' and a locomotion mode at 44". As can be seen, fuel cell apparatus 44 can be equipped with flexible upper 46 and lower 48 electrodes, these electrodes being positioned to be exposed to interface with a microbial environment. Additionally seen in this figure is how flexible electrodes 46 and 48 undergo a transmutation process between a non-planar streamlined configuration depicted at 44" to a substantially bottom conforming configuration of 44'. To provide ease of locomotion, the advantages of streamlining the electrodes can easily be seen. Additionally the advantage of the electrodes, or at least the lower anode electrode 48, to become substantially bottom conforming in a bottom-contact mode is readily apparent. Though both electrodes are shown to take identical configurations whether in locomotion or bottom-contact modes, any combination of these profiles can be used as desired.

To provide depth-sensitivity to enable the fuel cell apparatus 44 to go from a streamlined configuration to a substantially bottom conforming configuration and back, depth sensitive bladders or foam 50 can be incorporated within the apparatus so that these enable a streamlined configuration during locomotion mode and a substantially bottom conforming configuration when a bottom-contact mode is reached.

Figure 5:
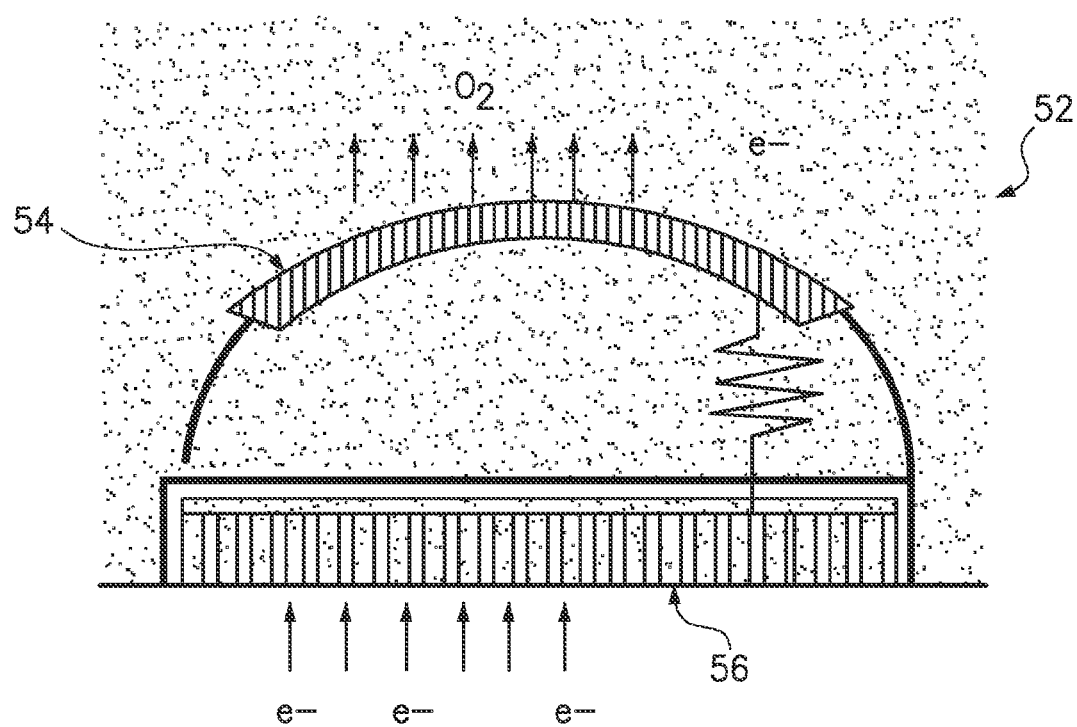
FIG. 5 depicts a side cross-sectioned view of an embodiment of the self-propelled microbial fuel cell shown deployed in a bottom-contact mode.

Referring now to FIG. 5, a cross-section of a self-propelled microbial fuel cell apparatus 52 is shown illustrating use of a curved cathode 54 and a substantially bottom conforming anode 56. While cathode 54 is shown free-flooded in this instance, such free flooding is not required provided that the cathode has some exposure to an oxygen providing environment such as seawater. The anode used in this application, as well as other applications, can be impregnated with microbial nutrients to attract, accelerate and sustain microbial colonies to generate energy even after the fuel cell anode is detached from a nutrient rich source such as marine sea-bed sediment.

Figure 6A:
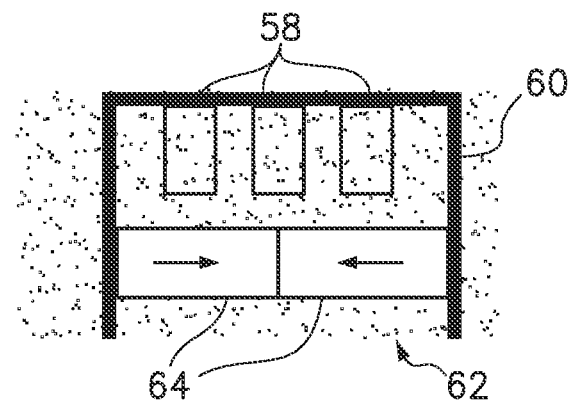
FIGS. 6A and 6B show a self-propelled microbial fuel cell used in conjunction with a depth-dependent enclosure section.
Figure 6B:
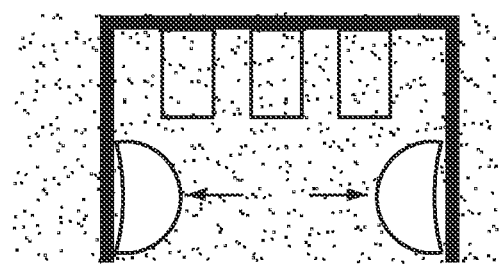

In FIGS. 6A and B, there is shown an alternative embodiment wherein a microbial fuel cell anode 58 and enclosure 60, having a lower opening 62, is provided with a depth-dependent section 64 within opening 62. FIG. 6A shows section 64 in a closed blocking position and FIG. 6B shows section 64 in an open position.

Depth-dependent section 64 can be enabled via depth-sensitive foams or bladders. When utilized in conjunction with an ocean glider vehicle, for example, the depth-dependent sections can enable enclosure 60 to be closed when the vehicle is transiting at shallow depths and to open when the vehicle is bottomed.

Such operation allows the anode chamber to be closed in vehicle transit mode to form continuous and transit-efficient vehicle surfaces as well as to provide an environment wherein microbial activity can be retained and sustained when the vehicle is operating off bottom. The depth dependent sections additionally permit the self-propelled microbial fuel cell vehicle to operate in a bottom-contact mode such that the section becomes open at bottom-contact depth and the fuel cell anode becomes fully exposed to nutrient rich surfaces when on a sea bottom or when interfacing with another surface supplying sufficient nutrients.

The self-propelled microbial fuel cell apparatus described herein can essentially operate indefinitely by recharging off of microbial activity found for example at the ocean bottom, or at ground, water or air interfaces.

The electrodes of this apparatus need not be always positioned similarly, that is it is not a requirement that the apparatus have an upper cathode and a lower anode. A reverse of this arrangement may be suitable or even an arrangement of the electrodes oriented somewhere in between, providing that in these other arrangements the electrodes are exposed to interface with a suitable microbial environment.

The apparatus can be utilized as a large migrating energy platform or mother vehicle which could charge up or transfer data and mission commands to smaller vehicles and divers thru wireless methods.

Additionally, the apparatus could be integrated with nodes of a migrating sensor, navigation, or communication network, changing location and recharging at each new location. The apparatus could also be used to in a migrating role to scout out rich sediment interfaces for follow-on microbial fuel cell vehicles.

Other embodiments of the invention may be used to charge up other vehicle types, such as under-sea, ocean surface, ground or air vessels/vehicles.

It is to be understood that many additional changes in the details, materials, steps and arrangement of parts, which have been herein described and illustrated to explain the nature of the invention by way of example, may be made by those skilled in the art within the principle and scope of the invention as expressed in the appended claims.

What is claimed is:

1. An underwater self-propelled microbial fuel cell apparatus comprising:
a microbial fuel cell having a depth sensitive flexible upper cathode electrode and a depth sensitive flexible lower anode electrode wherein said depth sensitive flexible electrodes take a non-planar streamlined configuration when in a locomotion mode and take a substantially planar configuration when in a bottom-contact mode, said lower anode electrode enclosed within an enclosure having a lower opening defined therein; and
a self-propelled underwater delivery vehicle wherein said microbial fuel cell is positioned within said self-propelled delivery vehicle so that said electrodes are exposed so that said cathode electrode is exposed to interface with seawater and said anode electrode is exposed to interface with marine sediment.

2. The self-propelled microbial fuel cell apparatus of claim 1 wherein said flexible electrodes are supported by compressible foam.

3. The self-propelled microbial fuel cell apparatus of claim 1 wherein said flexible lower anode electrode is impregnated with microbial nutrients.

* * * * *